(No Model.) 3 Sheets—Sheet 1.
G. EASTMAN.
PHOTOGRAPHIC ROLL HOLDER.
No. 407,647. Patented July 23, 1889.
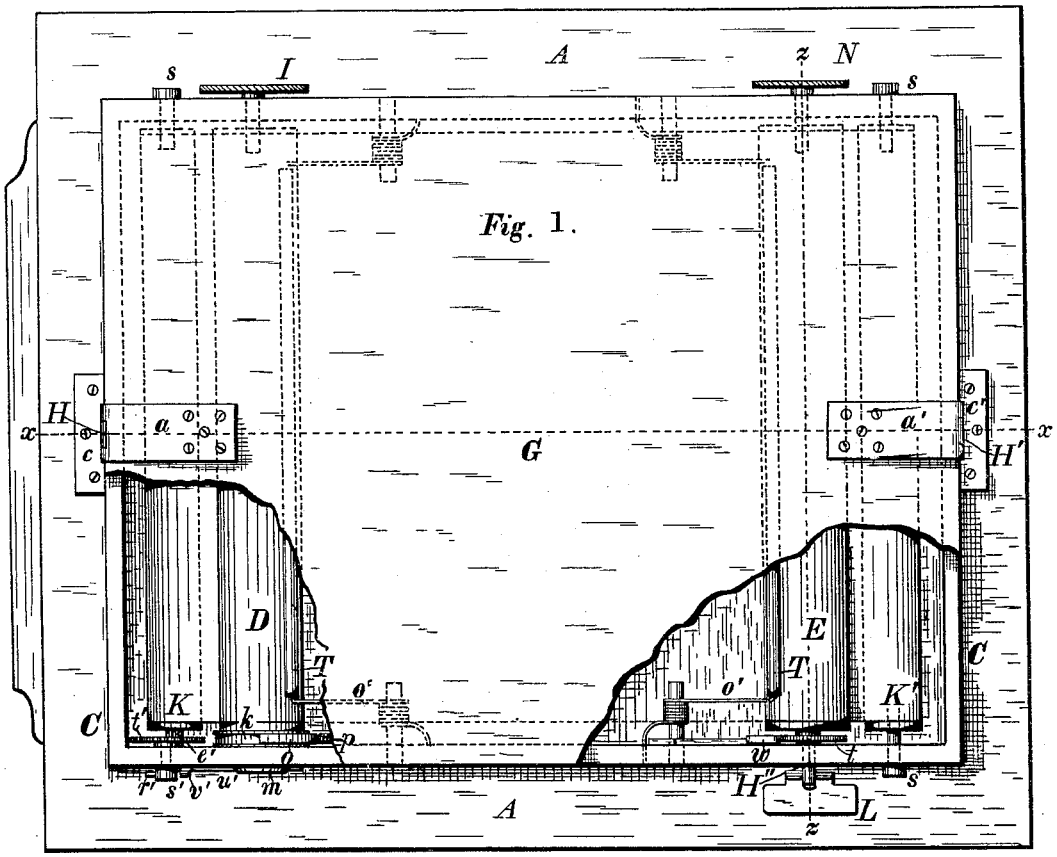
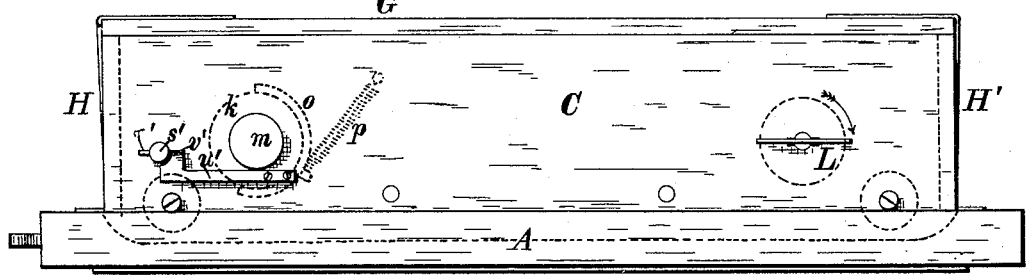
Witnesses
A. Sorge Jr
H. G. Phillips
Inventor
Geo. Eastman,
By his Attorney
Geo. B. Selden (No Model.) 3 Sheets—Sheet 2.

G. EASTMAN.
PHOTOGRAPHIC ROLL HOLDER.

No. 407,647. Patented July 23, 1889.

Witnesses
A. Sorge Jr.
H. G. Phillips.

Inventor
Geo. Eastman
By his Attorney
Geo. B. Selden.

(No Model.) 3 Sheets—Sheet 3.
G. EASTMAN.
PHOTOGRAPHIC ROLL HOLDER.
No. 407,647. Patented July 23, 1889.
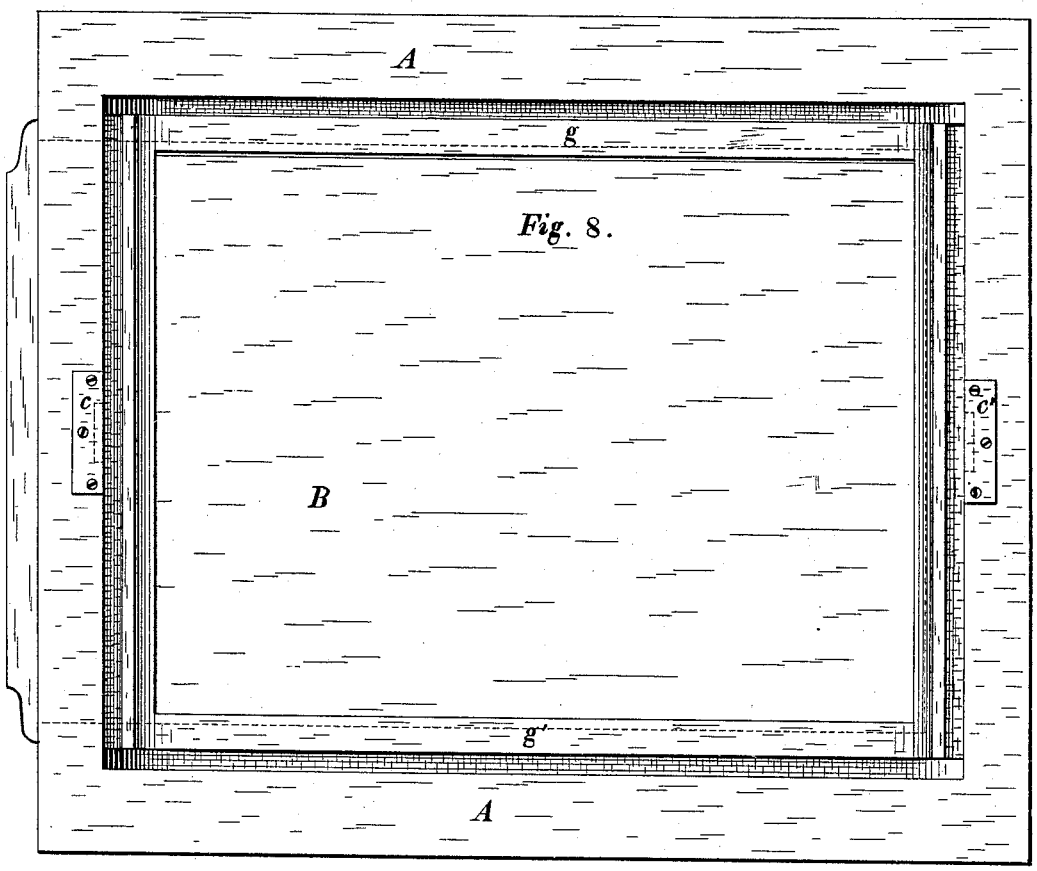
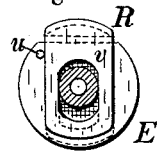
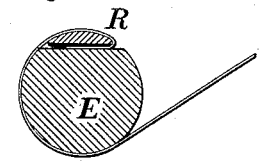
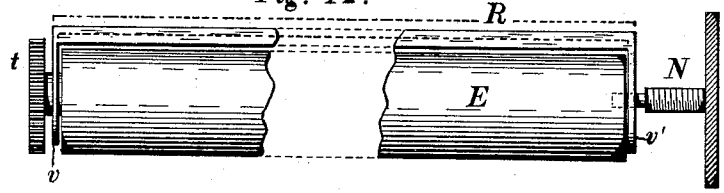
Witnesses
A. Sorge Jr.
H. G. Phillips.
Inventor
Geo. Eastman,
By his Attorney
Geo. B. Selden.

UNITED STATES PATENT OFFICE.

GEORGE EASTMAN, OF ROCHESTER, NEW YORK, ASSIGNOR TO THE EASTMAN DRY PLATE AND FILM COMPANY, OF SAME PLACE.

PHOTOGRAPHIC ROLL-HOLDER.

SPECIFICATION forming part of Letters Patent No. 407,647, dated July 23, 1889.

Application filed April 19, 1886. Serial No. 199,329. (No model.)

*To all whom it may concern:*

Be it known that I, GEORGE EASTMAN, a citizen of the United States, residing at Rochester, in the county of Monroe, in the State of New York, have invented certain Improvements in Photographic Roll-Holders, of which the following is a specification, reference being had to the accompanying drawings.

My present invention relates to certain improvements in the construction of roll-holders for exposing sensitized paper or film, having for their object the cheapening and simplification of such apparatus.

My improvements are fully described and illustrated in the following specification and accompanying drawings, and the novel features thereof specified in the claims annexed to the said specification.

My improvements in roll-holders are represented in the accompanying drawings, in which—

Figure 3:
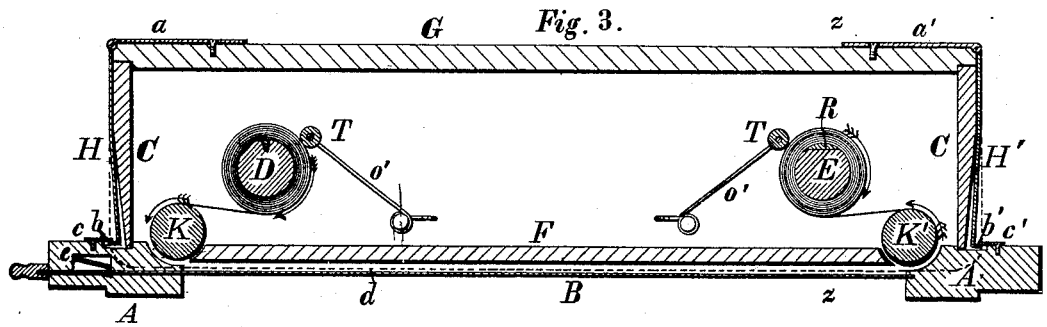
Figure 4:
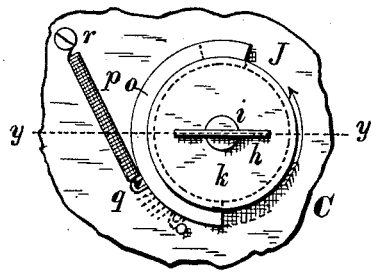
Figure 5:
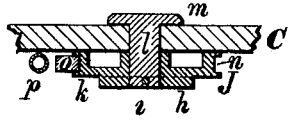
Figure 6:
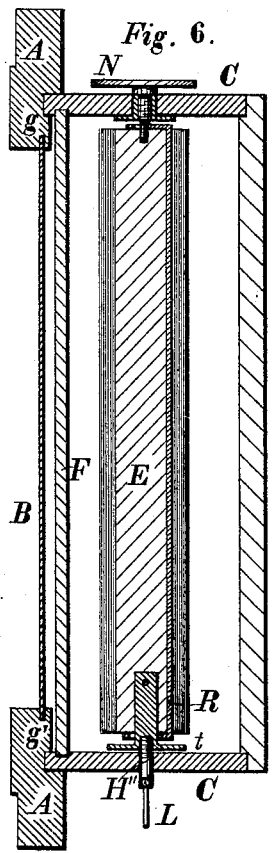
Figure 7:
Figure 9:
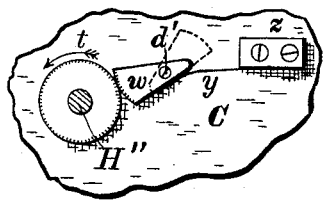

Figure 1 is a rear elevation of a roll-holder embodying my present invention. Fig. 2 is a view of the upper part of the same. Fig. 3 is a central longitudinal section on the line $x$ $x$, Fig. 1. Fig. 4 represents the brake or friction device as seen from the inside. Fig. 5 is a section on the line $y$ $y$, Fig. 4. Fig. 6 is a transverse section through the spool and casing on the line $z$ $z$, Figs. 1 and 3. Fig. 7 represents one end of the spool. Fig. 8 is an elevation showing the inside of the front. Fig. 9 represents the ratchet and pawl of the reel as seen from the inside of the case. Fig. 10 is an end view of the reel. Fig. 11 is a transverse section of the reel. Fig. 12 is a side view of the reel.

In the accompanying drawings, A represents the front of the roll-holder, which is provided with an exposing-slide B.

C is the casing, which incloses the spool D and reel E and sustains the paper-support F, and G is the back of the case. When the holder is closed, the back G and casing C are fastened to the front by means of suitable catches or hooks—such, for instance, as those shown at H H', Figs. 1, 2, and 3.

In the construction shown the catches H H' are hinged to the plates $a$ $a'$, attached to the back G, and extend along the ends of the case, their inner ends being provided with the lips $b$ $b'$, Fig. 3, which engage with the inner edges of the plates $c$ $c'$, attached to the front. The ends of the casing are recessed slightly, as shown in the sectional view, Fig. 3, to permit the disengagement of the catches H H' from the plates $c$ $c'$, when it is desired to open the holder, by pressing the ends of the catches inward. It is obvious, however, that any other preferred means of attaching the parts together may be adopted, and that instead of attaching the front to the back the casing C may be secured independently to both the front and back.

In order to render the structure light-tight, the back G is fitted to the casing with a rabbet or groove, and the front edges of the casing are fitted into grooves in the front, the sides of the casing being preferably made to project farther into the front than the ends, as indicated by the dotted line $d$, Fig. 3, which construction enables me to bring the paper-support immediately behind the exposing-slide B. The ends of the side walls of the case are preferably rounded, as indicated at each end of the dotted line $d$, as this permits the grooves in the front for their reception to be worked out with a rotary cutter. The front, at $g$ $g'$, Figs. 6 and 8, also forms guards or guides to hold the edges of the sensitized paper or film down against the surface of the paper-support F.

The molder may be made of any form or dimensions adapted to the production of negatives of any desired size. The exposing-slide is provided with the usual spring-shutter $e$, Fig. 3, to exclude the light when the slide is withdrawn.

The spool D, on which the sensitized paper or film is wound, its inner end being attached thereto in any preferred manner, is provided at one end with a socket for the reception of the end of the screw I, inserted in the case, and at the other end with a cross-groove and a recess, which receive the flange $h$ and boss $i$ of the brake or friction device J, by which the paper or film is maintained in a state of tension. The friction or brake consists, essentially, of a disk or collar $k$, attached to and revolving with the spindle $l$, which passes through the casing, and is provided with a head or flange $m$ on the outside thereof. Around the disk $k$ is formed the circumferential groove $n$, Fig. 5, into which the friction-clamp $o$ is fitted. The friction-clamp consists of a segment of a ring, of a length preferably a little greater than half of the circumference of the ring, the ring being turned out to a diameter slightly less than that of the groove $n$ in the disk $k$, so that when the segment is inserted in the groove its ends will spring outward slightly and embrace the disk with a pressure which affords a frictional resistance to the rotation of the disk and the spool. The friction-clamp $o$ is attached to the casing by means of the spring $p$, one end of which is connected with an eye or pin $q$ on the clamp and the other to the inside of the case at $r$, Fig. 4.

When the disk K is turned in the direction of the arrows in the figures, by the rotation of the spool, as the film or paper unwinds, the spring $p$ is extended, as indicated by the dotted lines in Fig. 4, and the clamp swings around with the disk until the strain on the spring becomes equal to the friction between the clamp and the disk, after which the disk will rotate independently of the clamp. The spring will, however, maintain a continuous strain on the paper or film, holding it taut along the front of the paper-support F, yielding slightly as the paper contracts or expands from absorption of or loss of moisture.

I prefer to fit the clamp into a groove $n$ in the edge of the disk; but it is obvious the construction might be reversed and the edge of the disk fitted between guides or flanges on the clamp. Any other suitable kind of spring may also be substituted for the spiral spring $p$, as herein shown, and any other suitable means may be employed for causing the disk $k$ to revolve with the spool D.

The paper-support F is attached to the side walls of the casing, filling the space between the rollers K K', about which the paper passes. The rollers K K' are supported by screws or pins $s$ $s$, inserted in the sides of the case, so as to revolve freely thereon.

The reel is located within the case at the opposite end from the spool, the arrangement being such that when the reel is turned by the thumb-piece L the film or paper will be unwound from the spool, and, passing around the guide-roll K, along the paper-support F, it travels around the roller K' and is wound upon the reel. The end of the paper may be attached to the reel in any suitable manner—as, for instance, by the pivoted clamp shown in Patent No. 317,049, the construction of which has now become well known in the art. I prefer, however, in this holder to make the clamp-bar to slide radially in and out from the reel, as represented in Figs. 10 and 11, for the purpose of cheapening the construction and for facilitating the introduction of the paper between the clamp-bar and the reel. The clamp-bar R is made curved on its outer side and flat on its inner side, the reel being flattened to receive it. At each end the clamp-bar is bent inward over the ends of the reel, the inwardly-extending parts or arms $v$ $v'$ being slotted to permit the introduction of the point of the screw H'' and the shank or neck by which the ratchet $t$ is attached to the reel. The slots permit the clamp-bar to slide outward a short distance to allow the introduction of the end of the paper underneath it. Pins $u$, Fig. 10, inserted in the ends of the reel, sustain the clamp-bar against the pull or strain of the paper. As the reel revolves, the clamp-bar is drawn against the flattened surface of the reel and holds the paper by friction firmly between its interior and the reel.

At one end the reel is supported by the screw N and at the other by the stem H'' of the thumb-piece L, which may be threaded and fitted to a threaded hole in the ratchet $t$, in which case the reel is removable from the casing.

The reverse motion of the reel is prevented by means of the pawl $w$, pivoted to the case at $d'$, and engaging with the teeth or serrations of the ratchet $t$. A spring $y$, attached to the case at $z$, serves to hold the pawl in engagement with the ratchet $t$ and to prevent the reel from being turned backward either accidentally or under the strain of the tension device on the spool. The arrangement is such, however, that the pawl $w$ may be reversed or turned backward out of engagement with the ratchet, as indicated by the dotted lines in Fig. 9, in which case the reel is free to revolve in either direction for the purpose of removing exposed film therefrom or to facilitate the attachment of the film to the reel. Both the reel and the spool are provided with the friction-brakes T, sustained by the springs $o'$.

I provide my improved roll-holder with both an audible and a visible indicator to show the operator the relative position of the exposed and unexposed paper or film. The visible indicator consists of a pin $r'$, Figs. 1 and 2, inserted in a stud or spindle $s'$, which extends through the casing and is connected by the gearing $t'$ with one of the guide-rolls K or K'. A pinion is attached to one of the guide-rolls and meshes with the gear $t'$, so as to cause the latter to make one revolution for each length of film necessary for an exposure which passes around the roller. The stud $s'$ and the visible indicator $r'$ being connected with the gear $t'$ will consequently make one revolution for each length of film shifted from the spool to the reel, and as the stud $s'$ projects through the case, and as the pin $r'$ is inserted in it outside of the case the amount of the film fed forward will consequently be indicated to the operator. In order to furnish, also, an audible indication of the shifting of the film of the proper length, I attach to the outside of the case a spring $u'$, the outer end of which is bent outward at $v'$, so that as the pin $r'$ revolves it will pass under it, thereby forcing the spring outward from the case, so that when the spring is released by the continued movement of the pin it will snap back again against the case and notify the operator that the reel has been turned far enough. This arrangement furnishes in a suitable and cheap manner both an audible and visible indicator of the position of the film.

The practical operation of making photographic negatives by the use of my improved holder will be evident to the experienced photographer from the foregoing description and accompanying drawings. The spool of unexposed paper or film having been inserted in its proper place in the holder, the end of the paper is extended along the paper-support and attached by means of the clamp-bar R to the reel E. The reel is then turned slightly, so as to produce a tension on the paper or film by the friction device J, and in this position the first exposure is made. Previous to the next exposure the operator, by turning the reel E by means of the handle or thumb-piece L, shifts the exposed film along the paper-support and winds it upon the reel, while a corresponding length of unexposed film passes from the spool in front of the paper-support ready for another exposure. The operation of shifting the film is repeated between each exposure, the audible or visible indicators, or both, being used to indicate to the operator the proper number of rotations to be given to the reel E.

The operations of inserting the spool in the case and of removing the exposed film from the reel are much facilited by the construction herein shown, in which the front of the case and the back of the holder are independent and separable; and my improved roll-holder possesses these further advantages over previous devices for accomplishing the same purpose, in that it is cheaper to construct, not liable to get out of order, and for many purposes gives as satisfactory results in practical use as devices of a more expensive construction.

I claim—

1. The combination, in a roll-holder, of the detachable front A, provided with the exposing-slide B, the detachable case C, sustaining the film-support F and inclosing the operating mechanism and the back G, and suitable means for attaching the front, casing, and back to each other, substantially as described.

2. The combination, in a roll-holder, of the front A, provided with the exposing-slide B, the casing C, sustaining the paper-support of the operating mechanism, the back G, and the spring-catches H H', substantially as described.

3. In a photographic roll-holder, the combination, with the detachable front A, provided with guards $g\,g'$, of the casing C, carrying the paper-support F and inclosing the operating mechanism, and the back G, substantially as described.

4. In a photographic roll-holder, the combination, with the reel E, of the clamp-bar R, provided with slotted arms $d\,d'$, substantially as described.

5. The combination, with the photographic roll-holder, of the guide-roll K, pinion $e'$, gear $t'$, stud $s'$, and indicator $r'$.

6. In a photographic roll-holder, an audible and visible indicator consisting of the revolving pin $r'$ and spring $u'$, attached to the exterior of the case, substantially as described.

7. In a photographic roll-holder and in combination with the measuring-roll thereof, an audible and visible indicator, with intermediate gearing connecting them with the measuring-roll, substantially as described.

8. In a photographic roll-holder, the combination, with a detachable film-spool, of a friction-wheel mounted on the casing, a segmental clamp mounted upon said wheel and held in frictional engagement therewith by the spring of the material of which it is constructed, and a spring attached at one end to the casing and at the opposite end to the segmental clamp, substantially as described.

9. In a photographic roll-holder, a tension or film-straining device comprising a friction-clamp embracing a surface rotating in unison with the film-spool, and a spring engaging said friction-clamp to limit its motion, substantially as described.

10. In a photographic roll-holder, the combination, with the film-spool and a cylindrical friction-surface connected to rotate in unison with said spool, of a friction-clamp applied to and embracing said friction-surface, and a spring for restraining the movement of the friction-clamp, substantially as described.

11. In a photographic roll-holder and in combination with the film-spool and grooved friction-wheel or surface, a friction-clamp occupying the groove in the friction-wheel and engaging the latter, and a device engaging said friction-clamp to restrain its motion in one direction only, substantially as described.

12. In a photographic roll-holder, the combination, with the circumferentially-grooved friction-wheel adapted to be connected to and rotated in unison with the film-spool, of a segmental friction-clamp sprung upon the friction-wheel, and a spring connected to said clamp, substantially as described.

GEO. EASTMAN.

Witnesses:
GEO. B. SELDEN,
H. G. PHILLIPS.